United States Patent
Kinugasa (10) Patent No.: US 10,670,286 B2
(45) Date of Patent: Jun. 2, 2020

(54) AIR CONDITIONING CONTROL APPARATUS

(71) Applicant: DAIKIN INDUSTRIES, LTD., Osaka-shi, Osaka (JP)

(72) Inventor: Nanae Kinugasa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 1729 days.

(21) Appl. No.: 14/371,429

(22) PCT Filed: Oct. 24, 2012

(86) PCT No.: PCT/JP2012/077436
§ 371 (c)(1),
(2) Date: Jul. 9, 2014

(87) PCT Pub. No.: WO2013/105325
PCT Pub. Date: Jul. 18, 2013

(65) Prior Publication Data
US 2015/0012143 A1    Jan. 8, 2015

(30) Foreign Application Priority Data

Jan. 12, 2012  (JP) ................................ 2012-003717

(51) Int. Cl.
*F24F 11/30* (2018.01)
*G06Q 10/06* (2012.01)
(Continued)

(52) U.S. Cl.
CPC ............. *F24F 11/30* (2018.01); *G05D 23/19* (2013.01); *G06Q 10/06* (2013.01); *G06Q 50/06* (2013.01);
(Continued)

(58) Field of Classification Search
CPC .. F24F 11/30; F24F 11/47; F24F 11/46; F24F 2140/60; F24F 2110/00; G06Q 10/06;
(Continued)

(56) References Cited

U.S. PATENT DOCUMENTS

2005/0005621 A1* 1/2005 Jayadev ............. G05D 23/1923
                                              62/230
2009/0064697 A1* 3/2009 Kondo .................. F24F 3/1429
                                              62/271
(Continued)

FOREIGN PATENT DOCUMENTS

JP    11-325539 A    11/1999
JP    2005-36989 A    2/2005
(Continued)

OTHER PUBLICATIONS

European Search Report of corresponding EP Application No. 12 86 5471.2 dated Dec. 16, 2015.
(Continued)

*Primary Examiner* — Thomas C Lee
*Assistant Examiner* — Charles Cai
(74) *Attorney, Agent, or Firm* — Global IP Counselors, LLP (57) ABSTRACT

An air conditioning control apparatus adjusts an amount of energy consumed by air conditioners installed in a property. The air conditioning control apparatus includes an adjustment control part that executes an adjustment control during a predetermined adjustment time period, a measurement acquisition part that acquires a measurement of the amount of energy consumed by the air conditioners, an effect estimation part that estimates an effect during the adjustment time period of the adjustment control executed, and an adjustment control content determining part that determines the adjustment control based on the estimated effect. The
(Continued)

adjustment control is at least one of ventilation minimizing control reducing or stopping ventilation in order to minimize an accumulation of environmental loads, and sensible heat prioritizing control preferentially controlling sensible heat over latent heat in order to control a temperature of a room so that an accumulation of environmental loads is minimized.

9 Claims, 6 Drawing Sheets

(51) Int. Cl.
| | | |
|---|---|---|
| *G06Q 50/06* | (2012.01) | |
| *G05D 23/19* | (2006.01) | |
| *F24F 110/00* | (2018.01) | |
| *F24F 140/60* | (2018.01) | |
| *F24F 11/46* | (2018.01) | |
| *F24F 11/47* | (2018.01) | |
| *H02J 3/14* | (2006.01) | |

(52) U.S. Cl.
CPC ............ *F24F 11/46* (2018.01); *F24F 11/47* (2018.01); *F24F 2110/00* (2018.01); *F24F 2140/60* (2018.01); *H02J 3/14* (2013.01); *H02J 2310/14* (2020.01); *Y02B 70/3266* (2013.01); *Y02B 70/3275* (2013.01); *Y02P 90/84* (2015.11); *Y04S 20/242* (2013.01); *Y04S 20/244* (2013.01)

(58) Field of Classification Search
CPC ........ G06Q 50/06; G05D 23/19; Y02P 90/84; Y04S 20/244; Y04S 20/242; Y02B 70/3275; Y02B 70/3266; H02J 2003/143; H02J 3/14

USPC ........................................................ 700/276
See application file for complete search history.

(56) References Cited

U.S. PATENT DOCUMENTS

| | | | | |
|---|---|---|---|---|
| 2010/0114385 | A1* | 5/2010 | Dempster | G05B 15/02 700/276 |
| 2010/0298997 | A1* | 11/2010 | Ohba | H05K 7/20836 700/291 |
| 2010/0324962 | A1* | 12/2010 | Nesler | G01R 21/133 705/7.36 |
| 2012/0173026 | A1* | 7/2012 | Colby | G05B 15/02 700/276 |
| 2013/0085614 | A1* | 4/2013 | Wenzel | G05D 23/1923 700/277 |
| 2014/0157806 | A1* | 6/2014 | Ito | F24F 3/1411 62/92 |

FOREIGN PATENT DOCUMENTS

| | | |
|---|---|---|
| JP | 2011-149572 A | 8/2011 |
| JP | 2011-196683 A | 10/2011 |

OTHER PUBLICATIONS

International Search Report of corresponding PCT Application No. PCT/JP2012/077436 dated Jan. 29, 2013.
International Preliminary Report of corresponding PCT Application No. PCT/JP2012/077436 dated Jul. 24, 2014.

* cited by examiner

AIR CONDITIONING CONTROL APPARATUS

CROSS-REFERENCE TO RELATED APPLICATIONS

This U.S. National stage application claims priority under 35 U.S.C. § 119(a) to Japanese Patent Application No. 2012-003717, filed in Japan on Jan. 12, 2012, the entire contents of which are hereby incorporated herein by reference.

TECHNICAL FIELD

The present invention relates to an air conditioning control apparatus.

BACKGROUND ART

In conventional practice, there have been proposals of demand control systems that limit the capability of facility equipment such as air conditioners, on the basis of a power minimizing signal sent from a demand control to request a demand power adjustment, as is disclosed in Japanese Laid-open Patent Application No. 2011-149572, for example.

SUMMARY

Technical Problem

Figure 1:
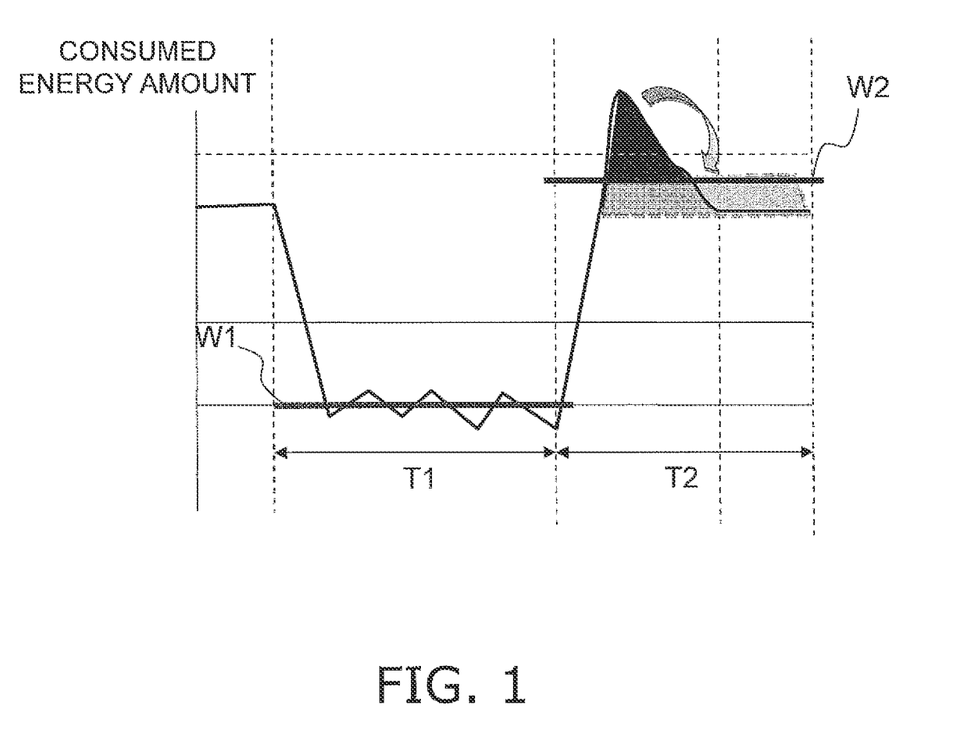
FIG. 1 is a graph showing the transition over time in the consumed energy amount of all of the air conditioners in a property.

However, when an adjustment to the consumed energy amount is performed by limiting the capability of facility equipment such as air conditioners as shown in Patent Literature 1, in the time period (T2 of FIG. 1) immediately following the adjustment time period (T1 of FIG. 1), an attempt is made to restore convenience, comfort, and the like lost by the capability limit as shown in FIG. 1, and the rapid increase in the consumed energy amount is a cause for concern. Because it is desirable for the power company supplying the power that the supply and demand of power be constant, the sudden increase in the consumed energy amount after the adjustment to the consumed energy amount is problematic. In view of this, consideration has been given to imposing penalties on sudden increases in the consumed energy amount after these adjustments, such as depriving incentives such as fee discounts for making adjustments to the consumed energy amount in response to a demand adjustment request. Therefore, it is desirable for the energy consumers to avoid sudden increases in the consumed energy amount after adjusting the consumed energy amount in response to events such as demand adjustment requests or fluctuations in energy rates.

An object of the present invention is to provide an air conditioning control apparatus that can minimize rapid increases in the consumed energy amount after the consumed energy amount has been adjusted.

Solution to Problem

An air conditioning control apparatus according to a first aspect of the present invention is an air conditioning control apparatus for adjusting the amount of energy consumed by air conditioners installed in a property, the air conditioning control apparatus comprising an adjustment control part and a measurement acquisition part. The adjustment control part executes adjustment control in a predetermined adjustment time period. The measurement acquisition part acquires a measurement of the amount of energy consumed by the air conditioners. The adjustment control is a control for controlling the air conditioners so that the amount of energy consumed by the air conditioners is minimized and rapid increases in the amount of energy consumed by the air conditioners are minimized after the adjustment time period.

In the air conditioning control apparatus according to the first aspect of the present invention, the adjustment control part executes adjustment control in the adjustment time period. The adjustment control is a control for controlling the air conditioners so that the amount of energy consumed by the air conditioners is minimized and rapid increases in the amount of energy consumed by the air conditioners are minimized after the adjustment time period. Specifically, control is performed for minimizing rapid increases in the amount of energy consumed by the air conditioners not after the adjustment control, but during the adjustment control and after the adjustment time period. As a result, it is possible to minimize rapid increases in the consumed energy amount of all of the air conditioners after the amount of energy consumed by the air conditioners has been adjusted.

The consumed energy amount is the amount of energy that is consumed. The energy is electricity, for example, and the energy amount is electric power expressed in units such as watts, or an electric power amount expressed in units such as watt-hours, for example.

An air conditioning control apparatus according to a second aspect of the present invention is the air conditioning control apparatus according to the first aspect, wherein the adjustment control includes ventilation minimizing control for reducing or stopping ventilation, sensible heat prioritizing control for preferentially controlling sensible heat over latent heat, or a combination of these two controls.

In the air conditioning control apparatus according to the second aspect of the present invention, it is possible to minimize the accumulation of environmental loads such as temperature or humidity during the adjustment time period, by minimizing the degradation of the indoor environment due to an influx of outside air, by preferentially controlling sensible heat, or by combining these two measures. As a result, it is possible to minimize rapid increases in the amount of energy consumed by the air conditioners after the adjustment time period. The amount of energy consumed by the air conditioners during the adjustment time period can also be minimized, and the compromising of comfort can be prevented as much as possible.

Sensible heat is heat that changes when the temperature increases or decreases, and latent heat is heat that does not change in temperature merely with situational changes, such as moisture in the air condensing, for example. To control the sensible heat is to control the temperature of the air in the room, and to control the latent heat is to remove the moisture in the air in the room by causing the moisture to condense, for example.

An air conditioning control apparatus according to a third aspect of the present invention is the air conditioning control apparatus according to the second aspect, further comprising an effect estimation part and an adjustment control content determining part. The effect estimation part estimates the effect during the adjustment request time period of the ventilation minimizing control and/or the sensible heat prioritizing control. The adjustment control content determining part determines the content of the adjustment control on the basis of the estimation.

In the air conditioning control apparatus according to the third aspect of the present invention, the effect estimation part estimates the effect during the adjustment request time period of the ventilation minimizing control and/or the sensible heat prioritizing control. The adjustment control content determining part determines the content of the adjustment control on the basis of the estimation by the effect estimation part. It is thereby possible to determine the content of effective adjustment control in order to minimize the accumulation of environmental loads in the adjustment time period.

An air conditioning control apparatus according to a fourth aspect of the present invention is the air conditioning control apparatus according to the third aspect, wherein the effect estimation part estimates the effect on the basis of at least one of the followings: the difference between outside air temperature and indoor temperature, the operating status of the air conditioners, and the difference between outside air humidity and indoor humidity.

In the air conditioning control apparatus according to the fourth aspect of the present invention, it is possible to determine the content of effective adjustment control in order to minimize the accumulation of environmental loads in the adjustment time period.

An air conditioning control apparatus according to a fifth aspect of the present invention is the air conditioning control apparatus according to the third or fourth aspect, wherein the control apparatus further comprises an influence evaluation part. The influence evaluation part evaluates the influence during the adjustment request time period of the ventilation minimizing control and/or the sensible heat prioritizing control. The adjustment control content determining part also determines the content of the adjustment control on the basis of the evaluation.

In the air conditioning control apparatus according to the fifth aspect of the present invention, it is possible to determine the content of appropriate adjustment control in order to both achieve comfort and minimize the accumulation of environmental loads in the adjustment time period.

An air conditioning control apparatus according to a sixth aspect of the present invention is the air conditioning control apparatus according to the fifth aspect, wherein the influence evaluation part evaluates the influence on the basis of the concentration of carbon dioxide in the room and/or the indoor humidity.

In the air conditioning control apparatus according to the sixth aspect of the present invention, it is possible to determine the content of appropriate adjustment control in order to both achieve comfort and minimize the accumulation of environmental loads in the adjustment time period.

An air conditioning control apparatus according to a seventh aspect of the present invention is the air conditioning control apparatus according to any of the second through sixth aspects, wherein the sensible heat prioritizing control is a control for adjusting a refrigerant evaporation temperature setting.

In the air conditioning control apparatus according to the seventh aspect of the present invention, increases in the temperature of the room in the adjustment time period can be minimized. Specifically, the accumulation of environmental loads in the adjustment time period can be minimized.

Advantageous Effects of Invention

In the air conditioning control apparatus according to the first aspect of the present invention, it is possible to minimize rapid increases in the consumed energy amount of all of the air conditioners after the amount of energy consumed by the air conditioners has been adjusted.

In the air conditioning control apparatus according to the second aspect of the present invention, it is possible to minimize rapid increases in the amount of energy consumed by the air conditioners after the adjustment time period. The amount of energy consumed by the air conditioners during the adjustment time period can also be minimized, and the compromising of comfort can be prevented as much as possible.

In the air conditioning control apparatus according to the third or fourth aspect of the present invention, it is possible to determine the content of effective adjustment control in order to minimize the accumulation of environmental loads in the adjustment time period.

In the air conditioning control apparatus according to the fifth or sixth aspect of the present invention, it is possible to determine the content of appropriate adjustment control in order to both achieve comfort and minimize the accumulation of environmental loads in the adjustment time period.

In the air conditioning control apparatus according to the seventh aspect of the present invention, increases in the temperature of the room in the adjustment time period can be minimized.

DESCRIPTION OF EMBODIMENTS

The following is a description, made with reference to the drawings, of an embodiment of an air conditioning control apparatus according to the present invention and an air conditioning control system comprising the air conditioning control apparatus.

(1) Overall Configuration

Figure 2:
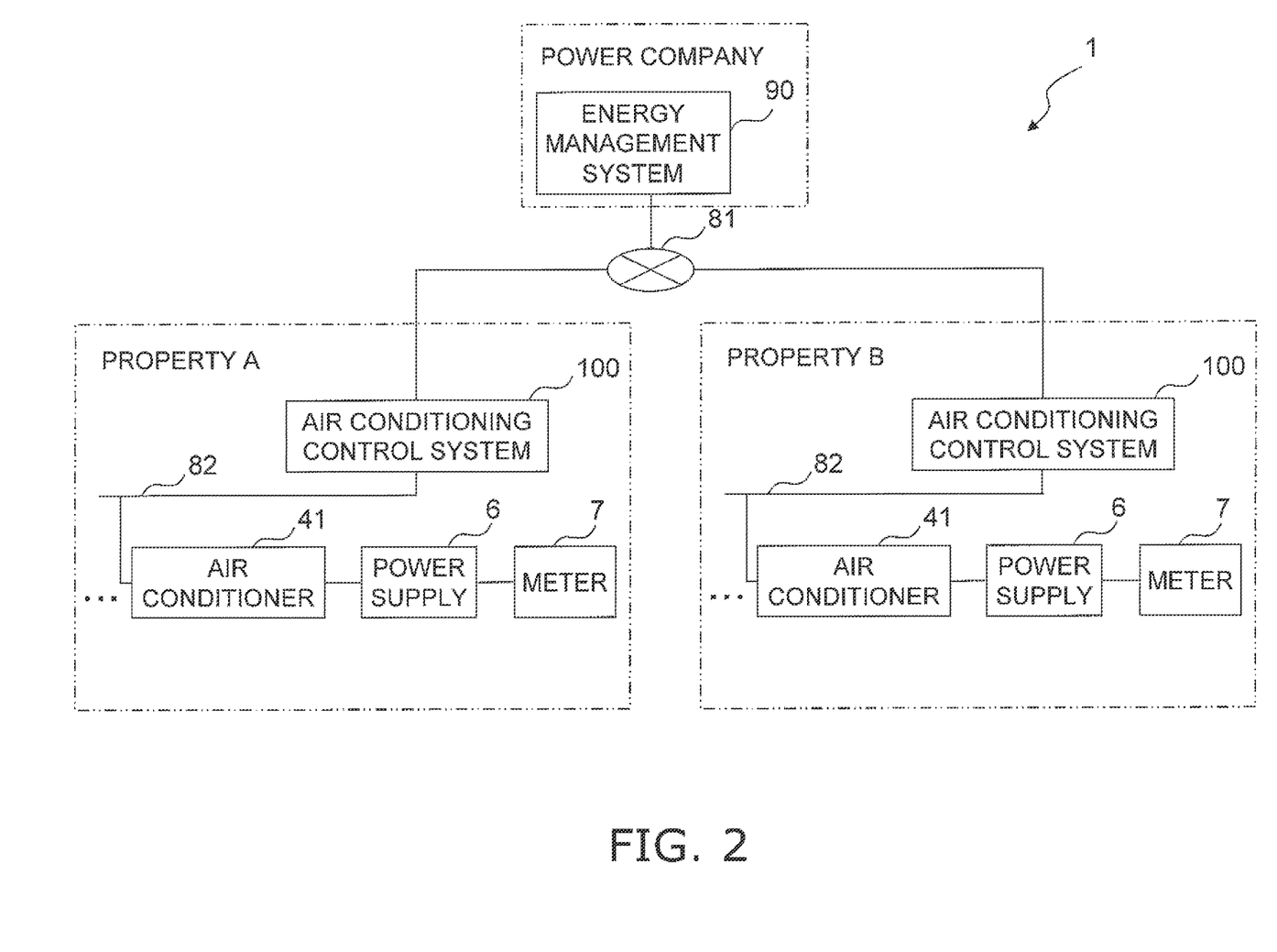
FIG. 2 is a deployment diagram of air conditioning control systems according to the present invention.

FIG. 2 is a schematic configuration diagram of air conditioning control systems 100 which are one example of an air conditioning control system according to the present invention.

Air conditioning control systems 100, which are disposed in properties A, B that are premises such as buildings or factories, manage the consumed energy amount of air conditioners 41, . . . installed in the properties A, B. Also installed in the properties A, B are power sources 6 for supplying energy to the air conditioners 41, . . . , and meters 7 for measuring the energy supplied from the power sources 6 to the air conditioners 41, . . . The air conditioning control systems 100, the air conditioners 41, . . . , and the meters 7 are connected by a communication network 82 such as a LAN. The air conditioners 41, . . . each have a control part, and the air conditioning control systems 100 control each of the air conditioners 41, . . . by transmitting commands to the control parts via the communication network 82. The air conditioning control systems 100 are connected via a communication network 81 such as the interact with an energy management system 90 owned by the power company supplying energy to the properties A, B. The consumed energy amount is the amount of energy that is consumed. The energy is electricity, for example, and the energy amount is electric power expressed in units such as watts, or an electric power amount expressed in units such as watt-hours, for example.

The energy management system 90, which is a system configured from one or more computers, manages the energy supplied to the properties A, B by adjusting the supplied amount in response to the demand for energy in a plurality of properties including these properties A, B. Various information pertaining to energy supply and demand is sent and received between the energy management system 90 and the air conditioning control systems 100.

For example, the power company sends a demand adjustment request that requests the consumed energy amount to be minimized, i.e. the energy demand to be adjusted in a predetermined time period (referred to as the adjustment time period T1 below), from the energy management system 90 to the air conditioning control systems 100 in both properties A, B. The content of the demand adjustment request, i.e. the minimizing amount of the energy amount consumed by all of the air conditioners 41, . . . in both properties A, B, is referred to as the requested minimized energy amount. The upper limit of the energy amount that can be consumed in order to achieve the requested minimized energy amount is referred to as the requested energy amount W1. If there are cases in which the requested minimized energy amount is a value uniquely established by the power company, there are also cases in which the requested minimized energy amount is a value established based on a minimized energy amount sent, or in other words, reported, by the air conditioning control systems 100 to the energy management system 90.

FIG. 1 is a graph showing the transition over time in the amount of energy consumed by all of the air conditioners 41, . . . in one property A or B. Having received a demand adjustment request, the air conditioning control system 100 performs a control so that the amount of energy consumed by all of the air conditioners 41, . . . , which are in the property A or B managed by the air conditioning control system 100 in the adjustment time period T1 (for fifteen minutes starting at 3:00 pm, for example) indicated by the demand adjustment request, goes from 500 kW to 400 kW or less, for example; and the air conditioning control system also performs a control so that the consumed energy amount is minimized by the requested minimized energy amount (100 kW, for example). Specifically, adjustment control is performed for adjusting the consumed energy amount in the adjustment request time period T1 so that the consumed energy amount is kept around the requested energy amount W1.

When the adjustment time period T1 elapses, there is a possibility of the air conditioners 41, . . . working in a state near the upper limit of operating capability in order to restore the comfort of the properties A, B that had been brought about by the air conditioners 41, . . . and that had decreased during the adjustment time period T1. For example, the air conditioners 41, . . . are operated at high output to eliminate the difference between the set temperature and the room temperature which have diverged during the adjustment time period T1. The consumed energy amount then rapidly increases in the time period T2 following the adjustment time period T1, as shown in FIG. 1. In view of this, the air conditioning control systems 100 perform adjustment control during the adjustment time period T1, so as to minimize the amount of energy consumed by all of the air conditioners 41, . . . and to minimize the rapid increase of the consumed energy amount during the time period T2 following the adjustment time period T1.

The air conditioners 41, . . . include air conditioners 41, . . . capable of air-cooling and air-warming operations, and air conditioners 41, . . . capable of a ventilating operation. The air conditioners 41, . . . comprise various sensors, such as thermistors capable of measuring indoor temperature and outside air temperature, and $CO_2$ sensors capable of measuring the concentration of carbon dioxide in the room.

(2) Detailed Configuration of Air Conditioning Control System

Figure 3:
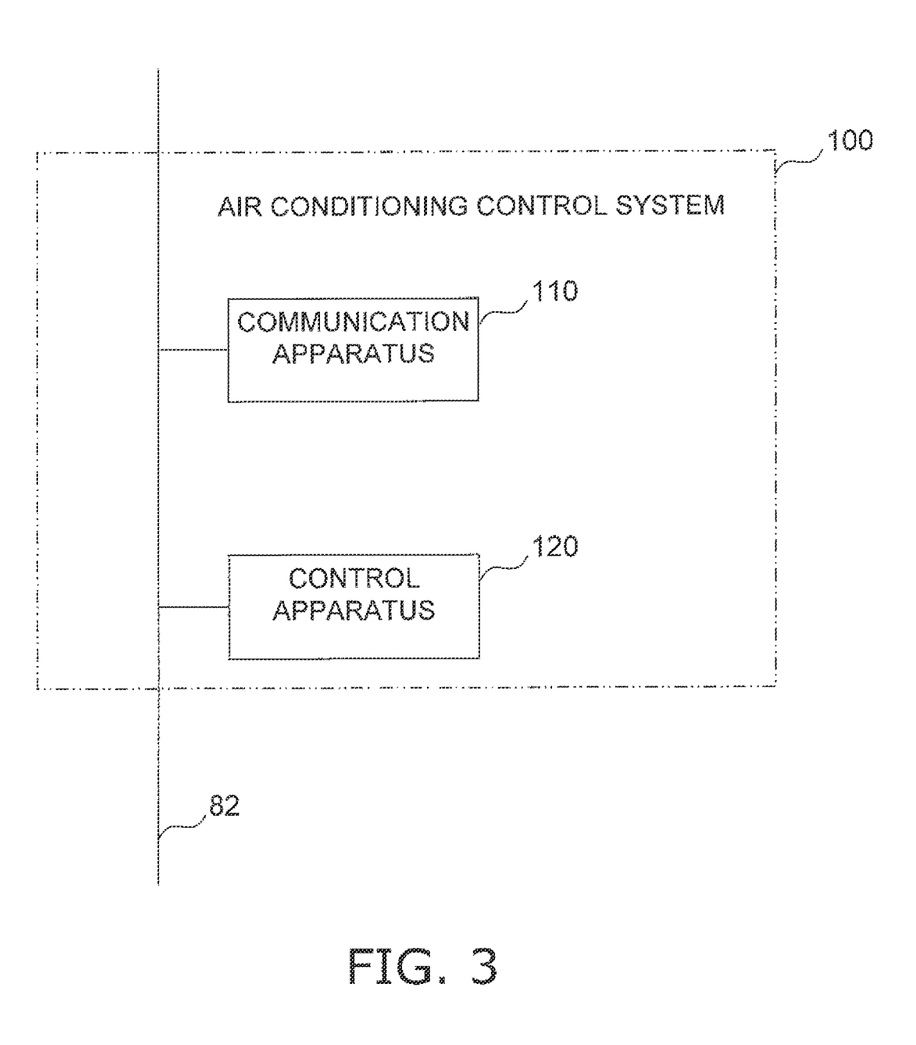
FIG. 3 is a schematic configuration diagram of an air conditioning control system according to the present invention.

FIG. 3 is a schematic configuration diagram of an air conditioning control system 100. The air conditioning control system 100 comprises a communication apparatus 110 and a control apparatus 120. The communication apparatus 110 and the control apparatus 120 are connected by the communication network 82 such as a LAN. The detailed configuration of the air conditioning control system 100 is described below. Because the air conditioning control system 100 installed in the property A and the air conditioning control system 100 installed in the property B have the same configuration, the air conditioning control system 100 is described from here on as the one installed in the property A in FIG. 2 for the sake of convenience in the description, unless otherwise specified.

(2-1) Communication Apparatus 110

Figure 4:
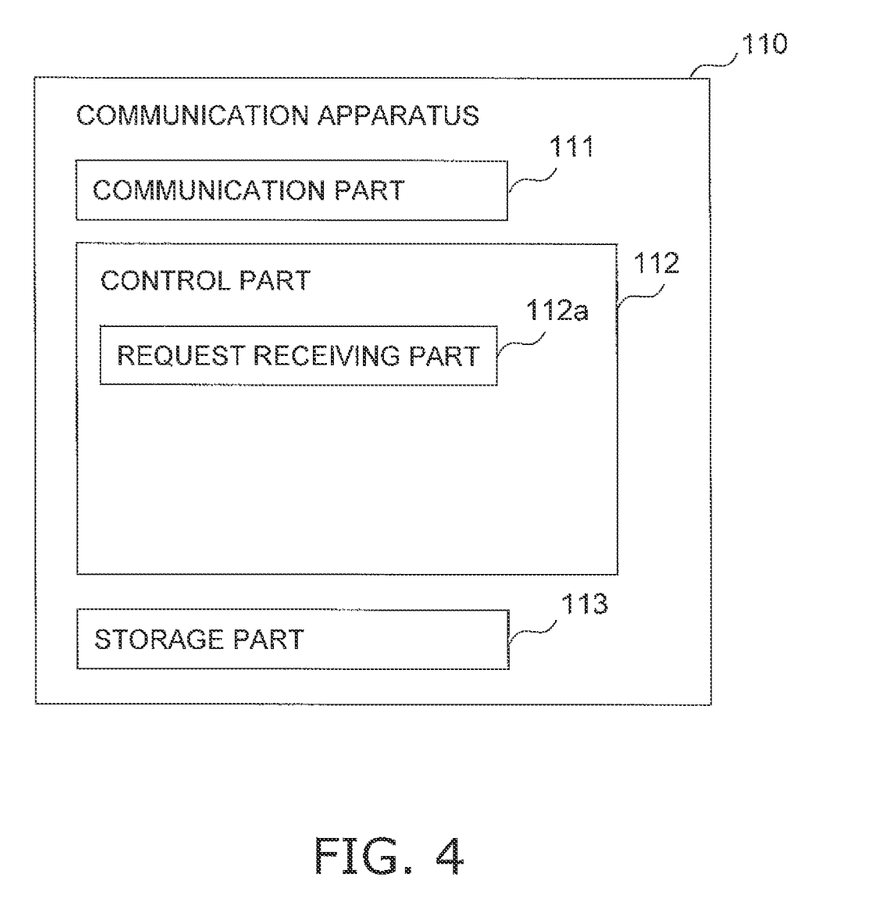
FIG. 4 is a schematic configuration diagram of a communication apparatus according to the present invention.

The communication apparatus 110 is an apparatus for sending and receiving various information, such as the demand adjustment request, to and from the energy management system 90. FIG. 4 is a schematic configuration diagram of the communication apparatus 110. The communication apparatus 110 has primarily a communication part 111, a control part 112, and a storage part 113, as shown in FIG. 4.

The communication part 111 is an interface capable of connecting the communication apparatus 110 with communication networks 81, 82 that use Ethernet (a registered trade name) or the like.

The storage part 113 is composed primarily of RAM, ROM, a hard disk, and the like, and the storage part stores various information such as programs for the communication apparatus.

The control part 112, which is composed primarily of a CPU, executes programs for the communication apparatus stored in the storage part 113. By executing programs for the communication apparatus, the control part 112 functions as a request receiving part 112*a* and the like.

The request receiving part 112*a* receives demand adjustment requests from the energy management system. Specifically, demand adjustment requests received by the communication part 111 from the energy management system 90 via the communication network 81 are stored in the storage part 113.

(2-2) Control Apparatus 120

Figure 5:
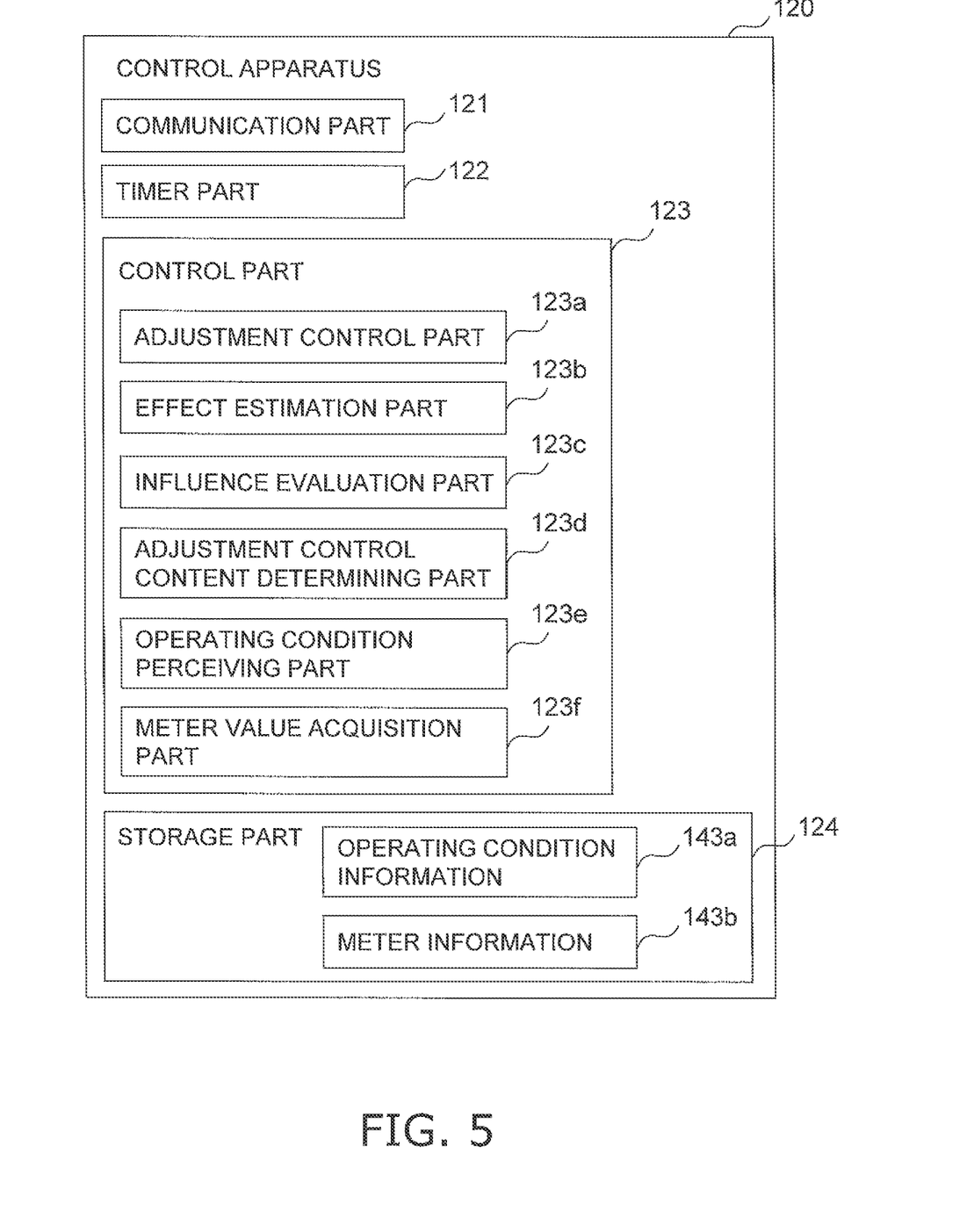
FIG. 5 is a schematic configuration diagram of an air conditioning control apparatus according to the present invention.

FIG. 5 is a schematic configuration diagram of the control apparatus 120. The control apparatus 120 is an apparatus for controlling the air conditioners 41, . . . , and is connected with the air conditioners 41, . . . via the communication network 82 such as a LAN. The control apparatus 120 has primarily a communication part 121, a timer part 122, a control part 123, and a storage part 124, as shown in FIG. 5.

The communication part 121 is an interface capable of connecting the control apparatus 120 with the communication networks 81, 82 which use Ethernet (a registered trade name) or the like.

The timer part 122 measures temporal elements such as the time, day, month, year, day of the week, and elapsed time duration based on a predetermined time.

The storage part 124 is composed primarily of RAM, ROM, a hard disk, and the like, and the storage part stores various information such as programs for the control apparatus.

The control part 123, which is composed primarily of a CPU, executes programs for the control apparatus stored in the storage part 124. By executing programs for the control apparatus, the control part functions as an operating condition perceiving part 123e, a meter value acquisition part 123f, an adjustment control part 123a, an effect estimation part 123b, an influence evaluation part 123c, and the like.

The functions of the control part 123 are described below.

(2-2-1) Operating Condition Perceiving Part 123e

The operating condition perceiving part 123e collects information pertaining to the operating status of the air conditioners 41, . . . at predetermined time intervals (every five minutes, for example). Specifically, the operating condition perceiving part 123e acquires information pertaining to the operating status of the air conditioners 41, . . . from the air conditioners 41, . . . and stores this information as operating condition information 143a in the storage part 124. Components such as the adjustment control part 123a, the effect estimation part 123b, and the influence evaluation part 123c refer to the operating condition information 143a stored in the storage part 124 when needing information pertaining to the operating status of the air conditioners 41, . . .

(2-2-2) Meter Value Acquisition Part 123f

The meter value acquisition part 123f acquires a meter value (data pertaining to the consumed energy amount) measured by the meter 7 at predetermined time intervals (every minute, for example). The meter value acquisition part 123f commands the storage part 124 to store this meter value as meter information 143b, in correlation with the air conditioners 41, . . . Components such as the adjustment control part 123a, the effect estimation part 123b, and the influence evaluation part 123c refer to the meter information 143b stored in the storage part 124 when needing information about the data pertaining to the amount of energy consumed by the air conditioners 41, . . .

(2-2-3) Adjustment Control Part 123a

The adjustment control part 123a performs adjustment control on the air conditioners 41, . . . Adjustment control, as previously described, is control for controlling the air conditioners 41, . . . so as to minimize the amount of energy consumed by all of the air conditioners 41, . . . and to minimize rapid increases in the amount of energy consumed by the air conditioners after the adjustment request time period. For example, in adjustment control, the amount of energy consumed by the air conditioners 41, . . . is minimized during the adjustment request time period so that the requested minimized energy amount can be achieved according to the demand adjustment request. Specifically, minimizing of the consumed energy amount is performed by limiting the operating capability of the air conditioners 41, . . . in the adjustment request time period T1. To limit the operating capability is to stop the compressor or reduce the rotational speed of the compressor in the case of air conditioners 41, . . . capable of air-cooling and air-warming operations, or to stop the ventilation function or reduce the frequency of ventilation in the case of air conditioners 41, . . . having a ventilation function, for example.

(2-2-3-1) Adjustment Control

FIG. 7 is a chart showing an example of the content of adjustment control. The adjustment control is primarily ventilation minimizing control for reducing or stopping ventilation, sensible heat prioritizing control for preferentially controlling sensible heat over latent heat, or a control for minimizing the consumed energy amount and ensuring at least some of the environmental loads accumulate as little as possible during the adjustment time period by combining these two forms of control. Environmental loads are primarily the temperature, humidity, and concentration of carbon dioxide in the room.

The sensible heat is heat that changes when the temperature increases or decreases, and latent heat is heat that does not change in temperature merely with situational changes, such as moisture in the air condensing, for example. To control the sensible heat is to control the temperature of the air in the room, and to control the latent heat is to remove the moisture in the air in the room by causing the moisture to condense, for example.

(2-2-3-1A) Ventilation Minimizing Control

Humidity, hot air, and cold air can be stopped or minimized from flowing into the room from the outside by stopping ventilation or reducing the frequency of ventilation, for example. It is thereby possible to slow the speed at which the temperature in the room diverges from the set temperature of the air conditioners 41, . . . , even if the compressors of the air conditioners 41, . . . are stopped and heat exchange is stopped, for example. The decrease in comfort can thereby be minimized as much as possible, and the accumulation of environmental loads, i.e. the diverging of the temperature of the room from the set temperature can be minimized as much as possible. The increase in the temperature of the room during the adjustment time period is thereby minimized, i.e. the accumulation of environmental loads is minimized, and high-output operation of the air conditioners 41, . . . can therefore be minimized in order to restore the comfort in the room after the adjustment time period has ended. As a result, it is possible to minimize rapid increases in the consumed energy amount after the adjustment time period has ended.

(2-2-3-1B) Sensible Heat Prioritizing Control

In sensible heat prioritizing control, the evaporation temperature setting of the refrigerant is adjusted. Specifically, either the rotational speed of the compressors of the air conditioners 41, . . . is reduced, or the opening degrees of the expansion valves are further increased as well, or the temperature of the refrigerant flowing through the heat exchangers of the indoor units of the air conditioners 41, . . . is increased above the dew point during the air-cooling operation, for example. In other words, the evaporation temperature of the refrigerant is increased. The air in the room then falls due to heat exchange with the refrigerant, but the moisture in the air in the room does not condense. Therefore, the humidity in the room is not removed. However, because the temperature in the room falls, comfort is not compromised as much, and the consumed energy amount is minimized. The increase in the temperature of the room during the adjustment time period T1 minimized, i.e. the accumulation of environmental loads is minimized, and high-output operation of the air conditioners 41, . . . can therefore be minimized in order to restore the comfort in the room after the adjustment time period T1 has ended. As a result, it is possible to minimize rapid increases in the consumed energy amount after the adjustment time period has ended.

(2-2-4) Effect Estimation Part 123b

The effect estimation part 123b estimates the effect of consumed energy amount minimizing during the adjustment request time period in ventilation minimizing control and/or sensible heat prioritizing control. In other words, when ventilation minimizing control or sensible heat prioritizing control is executed in the adjustment request time period T1, the extent to which the consumed power amount can be minimized is calculated. Specifically, the effect estimation part 123b either acquires the current values of various sensors or refers to information such as the operating condition information and the meter information also stored in the storage part 124, and calculates effect on the basis of at least one of the difference between the outside air temperature and the indoor temperature, and the operating condition of the air conditioners 41, . . . From the outside air temperature, the indoor temperature, and the set temperature of the air conditioners 41, . . . , for example, it is possible to estimate how great the output of the air conditioners 41, . . . should be in order to control the difference between the indoor temperature and the set temperature to a predetermined range in the adjustment time period T1, when ventilation is reduced or stopped to minimize the inflow of outside air. The minimizable consumed energy amount in the adjustment time period T1 can be estimated by comparing this output estimation and the output estimation when ventilation has not been reduced or stopped. Otherwise, the minimizable consumed energy amount can be estimated by raising the evaporation temperature of refrigerant flowing through the heat exchangers of the indoor units of the air conditioners 41, . . . and preferentially processing sensible heat over latent heat, without reducing or stopping ventilation in the adjustment time period T1.

(2-2-5) Influence Evaluation Part 123c

The influence evaluation part 123c evaluates influence during the adjustment time period T1 of ventilation minimizing control and/or sensible heat prioritizing control. Specifically, the influence evaluation part 123c acquires the current measurements from the various sensors and evaluates influence on the basis of the concentration of carbon dioxide in the room. For example, a time period during which ventilation may be stopped is calculated from the concentration of carbon dioxide in the room. If the concentration of carbon dioxide in the room is already close to the legal upper limit of 1000 ppm, the time period during which ventilation can be stopped is shortened.

(2-2-6) Adjustment Control Content Determining Part 123d

An adjustment control content determining part 123d determines the content of adjustment control on the basis of the estimation of the consumed energy amount minimizing effect by the effect estimation part 123b. At this time, the adjustment control content determining part 123d determines the content of adjustment control also on the basis of the evaluation by the influence evaluation part 123c. Specifically, sensible heat prioritizing control is selected if the time period in which ventilation can be stopped is shorter than the adjustment time period T1 as a result of the evaluation by the influence evaluation part 123c, even if the consumed energy amount minimizing requested by the demand adjustment request is expected to be achievable by the ventilation minimizing control for stopping ventilation, as a result of the estimation by the effect estimation part, for example. Otherwise, the control of switching to ventilation minimizing control after sensible heat prioritizing control is determined to be the adjustment control content. Basically, the adjustment control content determining part 123d compares the effects of consumed energy amount minimizing between ventilation minimizing control and sensible heat prioritizing control, selects the control that has the greater effect, and determines that this control is the adjustment control content. When a sufficient consumed energy amount minimizing effect is not achieved even when either ventilation minimizing control or sensible heat prioritizing control is selected, what is determined to be the adjustment control content is control that combines ventilation minimizing control and sensible heat prioritizing control, or in other words control in which both these controls are performed simultaneously.

(3) Control Content Determination and Control Execution Flow

Figure 6:
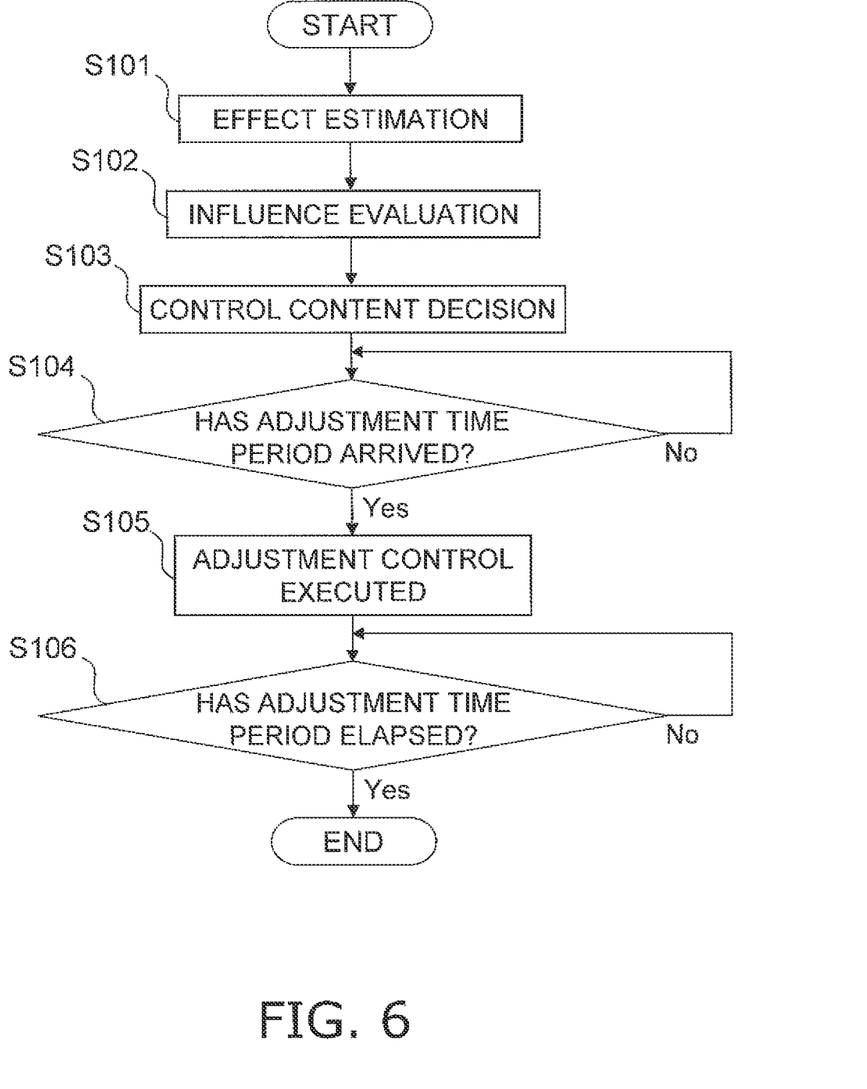
FIG. 6 is a flow diagram of control performed by an air conditioning control system according to the present invention.

FIG. 6 is a control flow chart of the content determination and execution of adjustment control.

The control flow starts when the air conditioning control system 100 receives a demand adjustment request from the energy management system 90. Specifically, when the communication part 111 of the communication apparatus 110 receives a demand adjustment request from the energy management system 90, the request receiving part 112a stores the demand adjustment request in the storage part 113. The request receiving part 112a transmits the demand adjustment request, along with a message stating that the demand adjustment request has been received, to the control apparatus 120 via the communication part 111. When the control apparatus 120 receives this message, the following control flow is initiated.

In step S101, the effects of both ventilation minimizing control and sensible heat prioritizing control are estimated by the effect estimation part 123b.

In step S102, the influences of both ventilation minimizing control and sensible heat prioritizing control are evaluated by the influence evaluation part 123c.

In step S103, the adjustment control content determining part 123d determines the adjustment control content on the basis of the effect estimation by the effect estimation part 123b and the influence evaluation by the influence evaluation part 123c.

In step S104, the control part 123 of the control apparatus 120 determines whether or not the adjustment time period T1 has arrived. If it has not arrived, step S104 is repeated until it arrives. When it has arrived, the control flow proceeds to step S105.

In step S105, the adjustment control part 123a executes adjustment control on the content determined by the adjustment control content determining part 123d. The adjustment control part 123a controls each of the air conditioners 41, . . . according to the control content determined by the adjustment control content determining part 123d, by transmitting commands to the control parts of the air conditioners 41, . . . via the communication network 82.

In step S106, the adjustment control part 123a of the control apparatus 120 determines whether or not the adjustment time period T1 has elapsed. If it has not elapsed, adjustment control is continued. Step S106 is repeated until the adjustment time period has elapsed. When it has elapsed, adjustment control is ended.

(4) Characteristics (4-1)

In the above embodiment, the control apparatus 120 comprises an adjustment control part 123a for executing adjustment control in the adjustment time period T1. The adjustment control is a control for controlling the air conditioners 41, . . . so that the amount of energy consumed by all of the air conditioners 41, . . . is minimized during the adjustment time period T1, and rapid increases in the amount of energy consumed by all of the air conditioners 41, . . . are minimized after the adjustment time period T1. In other words, control is performed for minimizing rapid increases in the amount of energy consumed by all of the air conditioners 41, . . . after the adjustment time period T1, not after adjustment control, but during adjustment control. As a result, in the above embodiment, it is possible to minimize rapid increases in the amount of energy consumed by all of the air conditioners 41, . . . after the amount of energy consumed by all of the air conditioners 41, . . . has been adjusted.

(4-2)

In the above embodiment, the energy control system comprises a control apparatus 120 and a communication apparatus 110. The communication apparatus 110 comprises a request receiving part for receiving a demand adjustment request from the upper-tier energy management system 90. The adjustment control part 123a of the control apparatus 120 controls the air conditioners 41, . . . in accordance with the demand adjustment request so as to minimize the amount of energy consumed by all of the air conditioners 41, . . . during the adjustment time period T1 specified by the demand adjustment request, and to minimize rapid increases in the amount of energy consumed by all of the air conditioners 41, . . . after the adjustment time period T1. It is thereby possible in the above embodiment to minimize rapid increases in the amount of energy consumed by all of the air conditioners 41, . . . , after the amount of energy consumed by all of the air conditioners 41, . . . has been adjusted, in accordance with the demand adjustment request.

(4-3)

In the above embodiment, the adjustment control content is either ventilation minimizing control for reducing or stopping ventilation, sensible heat prioritizing control for preferentially controlling sensible heat over latent heat, or a combination of these two controls measures. It is thereby possible to partially resolve environmental load accumulation during adjustment time period T1, and to minimize rapid increases in the amount of energy consumed by all of the air conditioners 41, . . . after the adjustment time period T1. It is also possible to minimize the amount of energy consumed by all of the air conditioners 41, . . . during the adjustment time period T1 and to prevent loss of comfort as much as possible.

(4-4)

In the above embodiment, the control apparatus further comprises the effect estimation part 123b and the adjustment control content determining part 123d. The effect estimation part 123b estimates the effects of both ventilation minimizing control and sensible heat prioritizing control during the adjustment request time period T1. The adjustment control content determining part 123d determines the content of adjustment control on the basis of these effect estimations by the effect estimation part 123b. It is thereby possible in the above embodiment to determine the adjustment control content that would be effective for minimizing the accumulation of environmental loads.

(4-5)

In the above embodiment, the effect estimation part 123b estimates the effect on the basis of factors such as the difference between the outside air temperature and the indoor temperature, and the operating status of the air conditioners 41, . . . It is thereby possible in the above embodiment to determine the adjustment control content that would be more effective for minimizing the accumulation of environmental loads.

(4-6)

In the above embodiment, the control apparatus 120 also has an influence evaluation part 123c. The influence evaluation part 123c evaluates the influence of both ventilation minimizing control and sensible heat prioritizing control during the adjustment time period T1. The adjustment control content determining part 123d determines the adjustment control content also on the basis of this evaluation. It is thereby possible in the above embodiment to determine the adjustment control content that would be appropriate for both minimizing the accumulation of environmental loads and making the room more comfortable.

(4-7)

In the above embodiment, the influence evaluation part 123c evaluates the influence on the basis of the concentration of carbon dioxide in the room, as acquired from the $CO_2$ sensor. It is thereby possible to determine the adjustment control content that would be more appropriate for both minimizing the accumulation of environmental loads and making the room more comfortable during the adjustment time period T1.

(4-8)

In the above embodiment, the sensible heat prioritizing control is a control for adjusting the evaporation temperature setting of the refrigerant flowing through the heat exchangers of the indoor units of the air conditioners 41, . . . during the air-cooling operation. Specifically, the sensible heat prioritizing control is a control for increasing the evaporation temperature above the dew-point temperature. Increases in the temperature in the room during the adjustment time period T1 can thereby be minimized. In other words, the accumulation of environmental loads during the adjustment time period T1 can be minimized.

(5) Modifications (5-1) Modification 1A

In the above embodiment, the air conditioning control system 100, which comprises a communication apparatus 110 and a control apparatus 120, is configured from a plurality of apparatuses. In another embodiment, however, all the functions of the communication apparatus 110 and the control apparatus 120 may be consolidated into a single apparatus, and the air conditioning control system 100 may be configured from a single apparatus. The number of apparatuses constituting the air conditioning control system 100 is also not limited to two or one, and may be increased as appropriate.

(5-2) Modification 1B

In the above embodiment, the effect estimation part 123b estimates the effects of both ventilation minimizing control and sensible heat prioritizing control. In another embodiment, however, the effect of either ventilation minimizing control or sensible heat prioritizing control may be estimated preferentially. If the effect estimation part 123b estimates the effect of either ventilation minimizing control or sensible heat prioritizing control and a sufficient effect of minimizing the consumed energy amount is expected, the influence evaluation part 123c evaluates the influence of that control. If the result of the evaluation is an assessment that this control can be continued during the adjustment time period T1, the adjustment control content determining part 123d determines this control to be the adjustment control content, and the effect estimation part 123b does not estimate the effect of the other control. The adjustment control content determining part 123d may also determine this control to be the adjustment control content without any reference to the evaluation of the influence evaluation part 123c. Alternatively, if a sufficient effect is not expected with this control, or if the result of the evaluation by the influence evaluation part 123c is an assessment that this control can be continued during the adjustment time period T1, the effect estimation part 123b estimates the effect of the other control. The influence evaluation part 123c also evaluates the influence of the other control.

(5-3) Modification 1C

In the above embodiment, the influence evaluation part 123c calculates the time periods during which both ventilation minimizing control and sensible heat prioritizing control can be executed. In another embodiment, however, an assessment may be made merely as to whether or not it is possible to execute both ventilation minimizing control and sensible heat prioritizing control. The evaluation result may be outputted by other means.

(5-4) Modification 1D

In the above embodiment, the adjustment time period T1 is a time period specified by the demand adjustment request from the energy management system 90. In another embodiment, however, the adjustment time period T1 may be a time period determined by the air conditioning control system 100. In this case, the first control part 123a of the control apparatus 120 designates a time period stored in advance in the storage part 124 as the adjustment time period T1, for example. The adjustment time period T1 may also be determined based on the operating status of the air conditioners 41, . . .

(5-5) Modification 1E

In the above embodiment, the air conditioning control system 100 performs adjustment control when a demand adjustment request has been transmitted from the energy management system 90. In another embodiment, however, the air conditioning control system 100 may perform adjustment control in order to independently minimize the amount of energy consumed by all of the air conditioners 41, . . . in order to adapt to events such as fluctuations in the energy unit price or increases in the consumed energy amount. For example, during the daytime when there is high demand for energy supply (from 1:00 pm to 3:00 pm, for example), when the energy unit price is set comparatively higher than other time ranges, the control apparatus 120 performs a control for minimizing the amount of energy consumed by all of the air conditioners 41, . . . , during a predetermined time period (the adjustment time period T1) in a day time range in order to adapt to these energy unit price fluctuations. In other words, the adjustment control part 123a performs adjustment control. Alternatively; adjustment control may be performed in a predetermined time period (the adjustment time period T1) when the amount of energy consumed by all of the air conditioners 41, . . . greatly increases beyond a predetermined range, regardless of whether or not there are fluctuations in the energy unit price depending on the time range.

(5-6) Modification 1F

In the above embodiment, each of the air conditioners 41, . . . comprises a $CO_2$ sensor, and the influence evaluation part 123c evaluates the influence of ventilation minimizing control on the basis of the carbon dioxide concentration acquired by the $CO_2$ sensor. In another embodiment, however, the air conditioners 41, . . . may be without $CO_2$ sensors. In this case, the carbon dioxide concentration may be speculated from design information of the properties A, B, such as the size of the rooms and an estimation value of the number of people who will use the rooms and from elapsed time from the previous ventilation, for example, and the influence of ventilation minimizing control may be evaluated based on this speculated value.

(5-7) Modification 1G

In the above embodiment, the effect estimation part 123b and the influence evaluation part 123c do not refer to the humidity measurement when estimating effect or evaluating influence. In another embodiment, however, each of the air conditioners 41, . . . may be provided with a humidity sensor. In this case, the effect may be estimated or the influence may be evaluated from the ventilation minimizing control and/or the sensible heat prioritizing control on the basis of the humidity measurement by the humidity sensor. For example, the effect estimation part 123b estimates the effect of sensible heat prioritizing control on the basis of the difference between the outside air humidity and the indoor humidity, and/or the operating status of the air conditioners 41, . . . The influence evaluation part 123c evaluates the influence of sensible heat prioritizing control on the basis of the indoor humidity.

Another option is to omit the humidity sensors and to speculate the humidity from the season, the temperature, and the operating conditions of the air conditioners 41, . . .

It is thereby possible in the above embodiment to determine the adjustment control content that would be more effective for minimizing the accumulation of environmental loads. It is also possible to determine the adjustment control content that would be more appropriate for both minimizing the accumulation of environmental loads and making the room more comfortable during the adjustment time period T1.

INDUSTRIAL APPLICABILITY

The present invention can be applied to various air conditioning control apparatuses and air conditioning control systems for minimizing the consumed energy amount.

What is claimed is:

1. An air conditioning control apparatus adapted to adjust an amount of energy consumed by aft conditioners installed in a property, the air conditioning control apparatus comprising:
   an adjustment control part configured to execute an adjustment control during a predetermined adjustment time period, a content of the adjustment control being selectable among
      a ventilation minimizing control reducing or stopping ventilation in order to minimize an accumulation of environmental loads, the ventilation minimizing control stopping or minimizing a flow of humidity and air into a room of the property,
      a sensible heat prioritizing control preferentially controlling sensible heat over latent heat in order to control a temperature of the room so that an accumulation of environmental loads is minimized, and
      a combination of the ventilation minimizing control and the sensible heat prioritizing control,
   the adjustment control controlling the air conditioners so that the amount of energy consumed by the air conditioners is minimized during the predetermined adjustment time period and rapid increases in the amount of energy consumed by the air conditioners are minimized after the adjustment time period; and
   a measurement acquisition part configured to acquire a measurement of the amount of energy consumed by the air conditioners;

an effect estimation part configured to estimate an effect during the adjustment time period of each of the ventilation minimizing control and the sensible heat prioritizing control, respectively, being executed;

an influence evaluation part configured to evaluate an influence during the adjustment time period of each of the ventilation minimizing control and the sensible heat prioritizing control, respectively, being executed; and an adjustment control content determining part configured to select the content of the adjustment control based on the estimated effect of the ventilation minimizing control and the sensible heat prioritizing control and the evaluated influence of the ventilation minimizing control and the sensible heat prioritizing control.

2. The air conditioning control apparatus according to claim 1, wherein the effect estimation part is further configured to estimate the effect based on at least one of a difference between outside air temperature and indoor temperature, an operating status of the air conditioners, and a difference between outside air humidity and indoor humidity.

3. The air conditioning control apparatus according to claim 1, wherein the influence evaluation part is further configured to evaluate the influence based on at least one of a concentration of carbon dioxide in the room and the indoor humidity.

4. The air conditioning control apparatus according to claim 2, wherein the adjustment control content determining part is further configured to compare effects on the amount of energy consumed during execution of the ventilation minimizing control and the sensible heat prioritizing control, to select whichever of the ventilation minimizing control and the sensible heat prioritizing control provides a greater effect as the content of the adjustment control, or select the combination of the ventilation minimizing control and the sensible heat prioritizing control as the content of the adjustment control.

5. The air conditioning control apparatus according to claim 2, wherein the sensible heat prioritizing control adjusts a refrigerant evaporation temperature setting.

6. The air conditioning control apparatus according to claim 1, wherein the influence evaluation part is further configured to evaluate the influence based on at least one of a concentration of carbon dioxide in the room and the indoor humidity.

7. The air conditioning control apparatus according to claim 2, wherein the adjustment control content determining part is further configured to compare effects on the amount of energy consumed during execution of the ventilation minimizing control and the sensible heat prioritizing control, to select whichever of the ventilation minimizing control and the sensible heat prioritizing control provides a greater effect as the content of the adjustment control, or select the combination of the ventilation minimizing control and the sensible heat prioritizing control as the content of the adjustment control.

8. The air conditioning control apparatus according to claim 2, wherein sensible heat prioritizing control adjusts a refrigerant evaporation temperature setting.

9. The air conditioning control apparatus according to claim 4, wherein the sensible heat prioritizing control adjusts a refrigerant evaporation temperature setting.

* * * * *

UNITED STATES PATENT AND TRADEMARK OFFICE
CERTIFICATE OF CORRECTION

PATENT NO. : 10,670,286 B2
APPLICATION NO. : 14/371429
DATED : June 2, 2020
INVENTOR(S) : Nanae Kinugasa It is certified that error appears in the above-identified patent and that said Letters Patent is hereby corrected as shown below:

In the Claims

In Column 14, Line 40, "energy consumed by aft conditioners installed" should be -- energy consumed by air conditioners installed --.

In Column 15, Line 31, "claim 2, wherein" should be -- claim 1, wherein --.

In Column 16, Line 6, "claim 2, wherein" should be -- claim 1, wherein --.

In Column 16, Line 10, "claim 1, wherein" should be -- claim 2, wherein --.

Signed and Sealed this
Twenty-fourth Day of November, 2020

Andrei Iancu
*Director of the United States Patent and Trademark Office*